United States Patent [19]
Campbell et al.

[11] Patent Number: 5,893,338
[45] Date of Patent: Apr. 13, 1999

[54] RABBIT HOUSING AND RABBIT HOUSING SYSTEM

[76] Inventors: Neil E. Campbell, 146 Cleveland Ave., Hasbrouck Heights, N.J. 07604; Chin Soo Park, 706 College La., Apt. 11, Salisbury, Md. 21804; James Best, 55 Bonn Pl., Weehawken, N.J. 07087

[21] Appl. No.: 08/742,993

[22] Filed: Nov. 1, 1996

[51] Int. Cl.[6] .................................................. A01K 1/02
[52] U.S. Cl. ........................... 119/475; 119/479; 119/482; 119/483
[58] Field of Search ............................. 119/500, 482, 119/479, 483, 452, 475, 51.05

[56] References Cited

U.S. PATENT DOCUMENTS

| | | | |
|---|---|---|---|
| 4,201,153 | 5/1980 | Nace | 119/482 |
| 4,696,257 | 9/1987 | Neary et al. | 119/500 |
| 4,852,520 | 8/1989 | Gpetz | 119/497 |
| 4,989,545 | 2/1991 | Sheaffer et al. | 119/419 |
| 5,000,120 | 3/1991 | Corio, Sr. et al. | 119/419 |
| 5,140,948 | 8/1992 | Roberts | 119/500 |

*Primary Examiner*—Edgar S. Burr
*Assistant Examiner*—Daniel J. Colilla
*Attorney, Agent, or Firm*—Stroock & Stroock & Lavan LLP

[57] ABSTRACT

An animal housing including a housing top, a housing bottom with a perforated floor, and a skirt. The skirt is configured so as to receive and support the housing bottom. A pan is disposed within the skirt such that the perforated floor of the housing bottom allows dander, urine and feces to drop therethrough onto the pan, and the pan is insertable into and removable from the skirt without disturbing the remainder of the animal housing. The animal housing further includes negative air flow means communicating with the skirt to produce a gas flow from the skirt to the negative air flow means. The animal housing may also include a frame and a bottle. The bottle includes a mouth having at least one lateral interior flange and at least one lateral exterior flange extending from the outer circumference thereof, and the frame includes a panel having at least one bottle-receiving aperture for receiving the mouth of the bottle. The bottle may be rotated to secure at least a portion of the panel between the at least one interior flange and the at least one exterior flange.

14 Claims, 7 Drawing Sheets

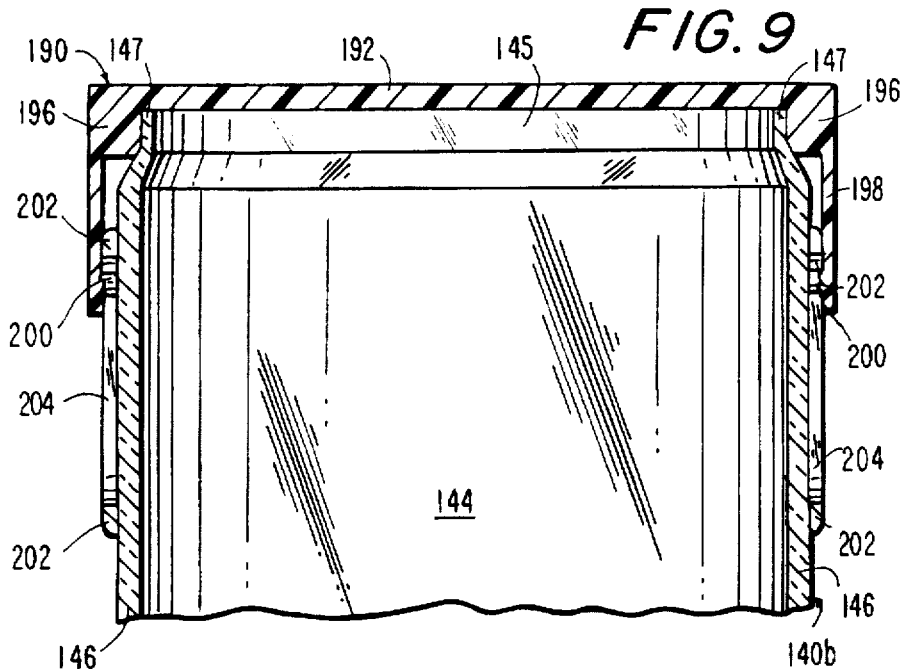
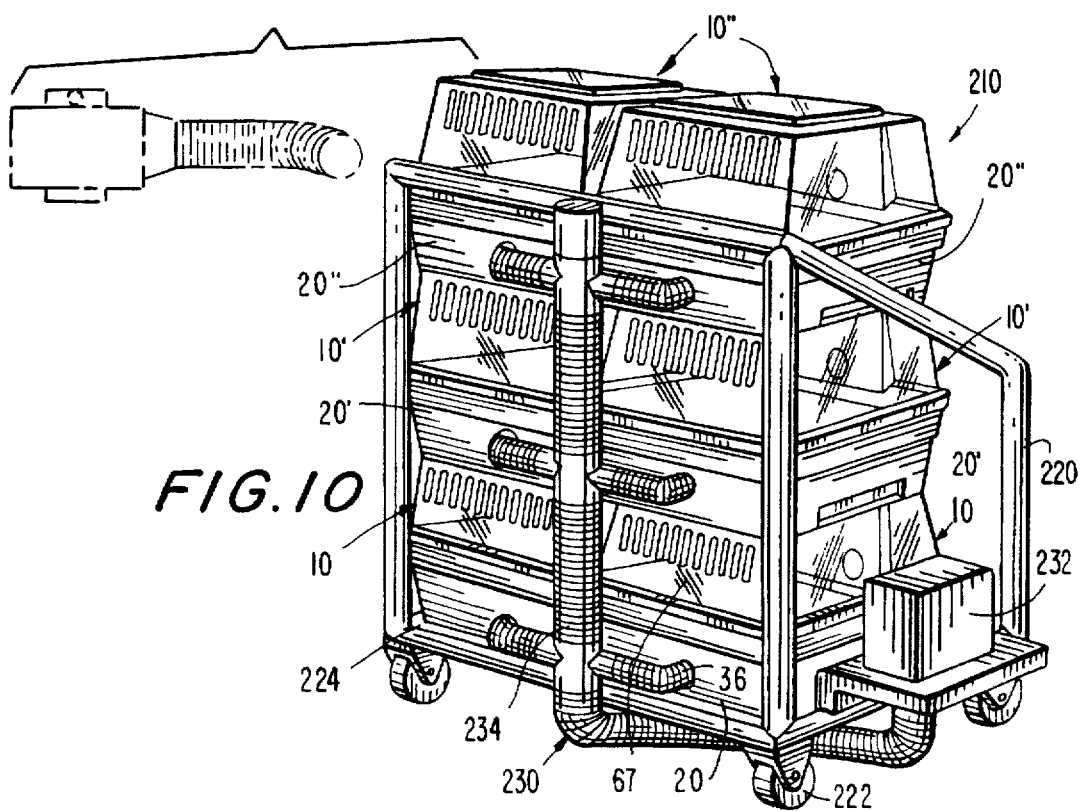

5,893,338

1

RABBIT HOUSING AND RABBIT HOUSING SYSTEM

BACKGROUND OF THE INVENTION

This invention relates generally to a rabbit housing and a rabbit housing system, and more particularly to a rabbit housing which facilitates observation of rabbits within the housing without disturbing the rabbits, and to a rabbit housing system which removes the build-up of ammonia and humidity from individual rabbit housings within the system without the need for traditional shelving or racks.

Rabbits are very sensitive to humans. Consequently, rabbits are prone to change their behavior when a human is in view. During an experiment involving rabbits maintained within housings, the visible presence of human observers outside the housings can detrimentally affect the observations and other data collected for the experiment. Presently, sheet metal or other rigid opaque materials are used which prevent viewing of the rabbit.

Maintaining rabbits within housings also requires adequate collection and removal of rabbit dander, urine and feces. In particular, there is a great concern regarding allergic reactions experienced by laboratory personnel when exposed to rabbit dander. Prior art housings have included a perforated bottom which allows dander, urine and feces to pass therethrough. Many of these prior art housings have also included an opaque plastic top, as described above, with a wire bar door attached thereto. A pan is placed below the entire cage to collect materials which drop through the floor, usually a metal grid. Food and water is provided in metal and/or glass containers mounted to the wire bar door.

These prior art housings suffer from several shortcomings. First, although the opaque top of the prior art rabbit housings helps to minimize the behavioral changes of rabbits therein in response to human visibility, the opaque housings also have the undesirable effect of shielding the rabbits within the housings from human observers. As a result, observation of rabbits within such housings is frustratingly difficult. Second, the substantially open nature of the wire bar door within the housing allows rabbit dander to easily pass therethrough, thus causing concern and discomfort for laboratory personnel having allergic reactions to dander. Third, as urine and feces drop through the metal grid floor into the pan below the housing, ammonia and humidity build up within the housing. The increased humidity makes breathing more difficult for rabbits within the housing, and the ammonia irritates the eyes and other membranes of the rabbits. This requires frequent changing of the pan to prevent interference with any ongoing experiment, but the pans of the prior art housings are difficult and cumbersome to change.

To facilitate experimentation involving a number of rabbits housed in separate housings, rack systems have been developed. These rack systems generally maintain a plurality of housings in a single transportable and storable unit. Using such a rack system, a plurality of housings may be easily moved as a single unit, and a single air supply and/or exhaust system may be mounted to the rack for supplying, withdrawing and filtering air for a plurality of housings. Rack systems for organizing a plurality of rabbit housings have traditionally been provided with shelves or racks for supporting such housings. In such prior art rack systems, each row of rabbit housings is placed upon a shelf, generally constructed of aluminum, steel or similar material, and a plurality of vertically stacked shelves can each thereby support a row of rabbit housings within the rack. However,

2 each shelf occupies a certain height within the rack, thereby increasing the overall height, volume, weight and cost of the rack. In addition, the generally opaque nature of the material used for constructing the shelves inhibits observation of rabbits within the housings if the housings are at least in part transparent. Furthermore, the lighting provided to the interior of such housings would also be inhibited because of the opaque shelf above each housing which effectively acts as a shade.

Accordingly, it is desired to provide a rabbit housing which enhances the observability of rabbits within the housing while reducing changes in rabbit behavior in response to the sight of humans and maintaining a dander barrier between the rabbits and laboratory personnel. It is also desired to provide a rabbit housing and rabbit housing system which eliminate the need for traditional shelving or racks, and which allow dander, urine and feces to be easily removed from the housing with minimal disturbance to rabbits within the housing.

SUMMARY OF THE INVENTION

Generally speaking, in accordance with the instant invention, an animal housing for housing an animal is provided. The animal housing includes a housing top, a housing bottom, and a skirt. The housing bottom is configured so as to receive and support the housing top and includes a perforated floor. The skirt is configured so as to receive and support the housing bottom. A pan is disposed within the skirt such that the perforated floor of the housing bottom allows dander, urine and feces to drop therethrough onto the pan, and the pan is insertable into and removable from the skirt without disturbing the remainder of the animal housing. The animal housing further includes negative air flow means communicating with the skirt to produce a gas flow from the skirt to the negative air flow means.

The animal housing may also include a frame and a bottle, the bottle including a mouth having at least one lateral interior flange and at least one lateral exterior bump or tab extending from the outer circumference thereof, and the frame including a panel having at least one bottle-receiving aperture for receiving the mouth of the bottle. The panel includes at least one notch adjacent the aperture for receiving the interior flange of the bottle, such that the mouth of the bottle may be inserted into the aperture and the at least one interior flange may be inserted through the at least one notch, and the bottle may be rotated to secure at least a portion of the panel between the at least one interior flange and the at least one exterior flange.

Accordingly, an object of the invention is to provide a rabbit housing which includes a suitable dander barrier for preventing the transmission of dander from rabbits to laboratory personnel.

Another object of the invention is to provide a rabbit housing with a door which maintains a suitable dander barrier for preventing the transmission of dander from rabbits to laboratory personnel.

A further object of the invention to provide a rabbit housing which provides enhanced observability of rabbits within the housing.

Still another object of the invention is to provide a rabbit housing which provides enhanced observability of rabbits within the housing while minimizing behavioral changes of rabbits within the housing in response to the sight of humans.

A still further object of the invention is to provide a rabbit housing with a door including at least one bottle mounted to the door, wherein the door and bottle maintain a suitable dander barrier for preventing the transmission of dander from rabbits to laboratory personnel, and which is provided.

Yet another further object of the invention is to provide rabbit housings which are easily and securely stackable upon one another.

A yet still further object of the invention is to provide a rabbit housing system which eliminates the need for traditional shelving or racks.

A still further object of the invention is to provide a rabbit housing system which is light in weight and reduces the overall volume required to maintain a predetermined number of rabbit housings.

Still other objects and advantages of the invention will in part be obvious and will in part be apparent from the specifications and drawings.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

Figure 1:
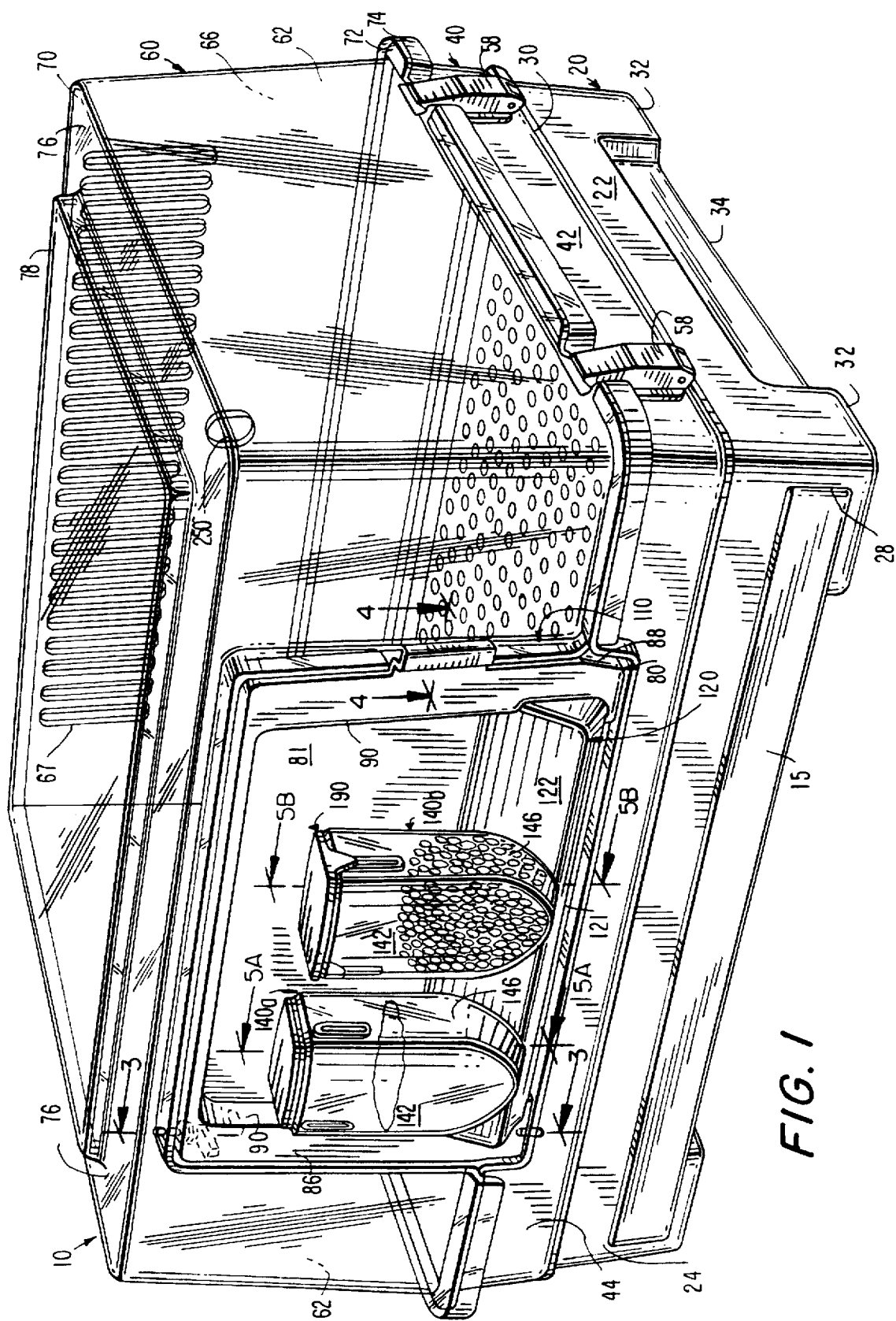
FIG. 1 is a perspective view of a rabbit housing constructed in accordance with the present invention.
Figure 5A:
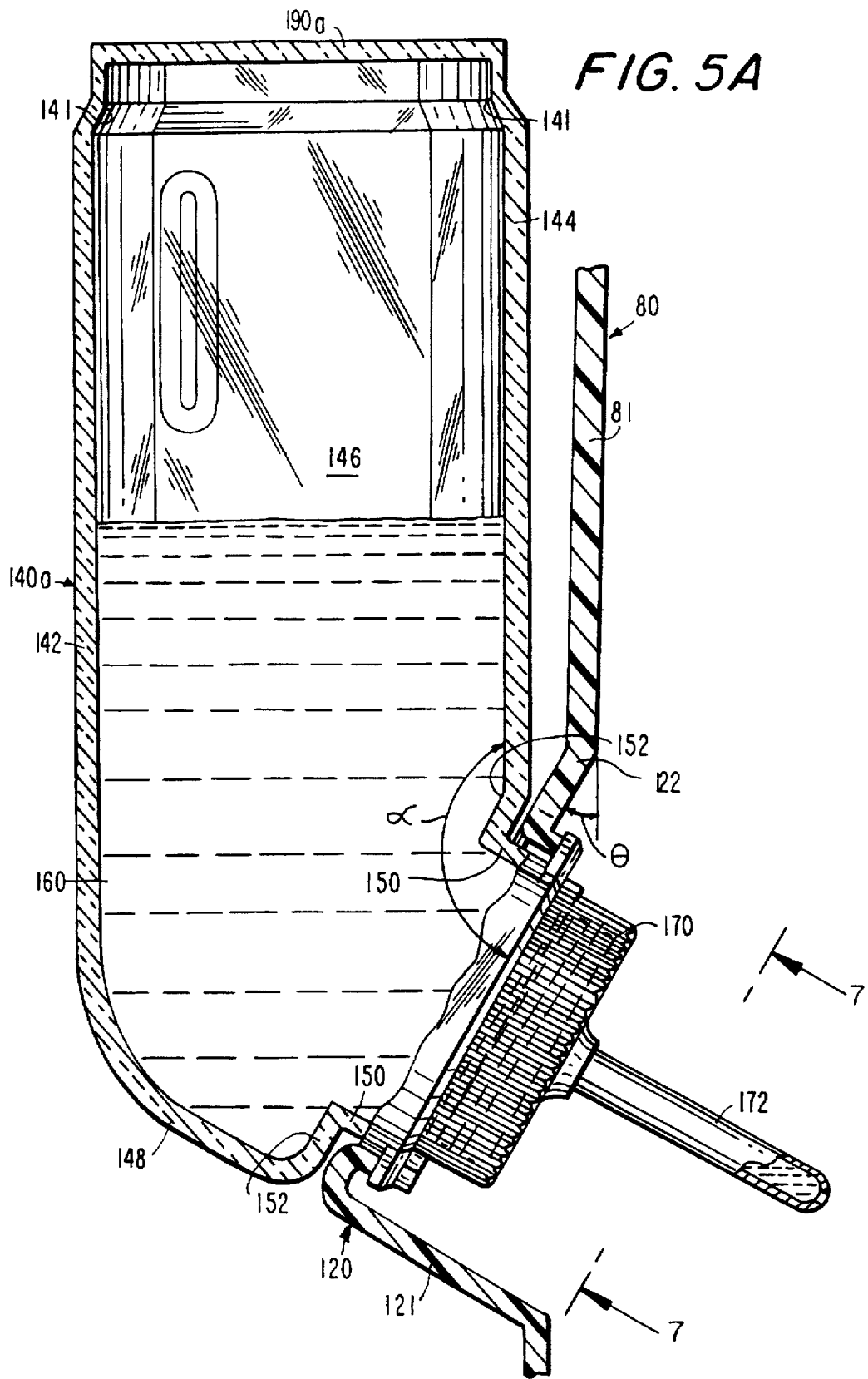
FIG. 5A is a sectional view of a water bottle constructed in accordance with the present invention taken along the line 5A—5A of FIG. 1.
Figure 5B:
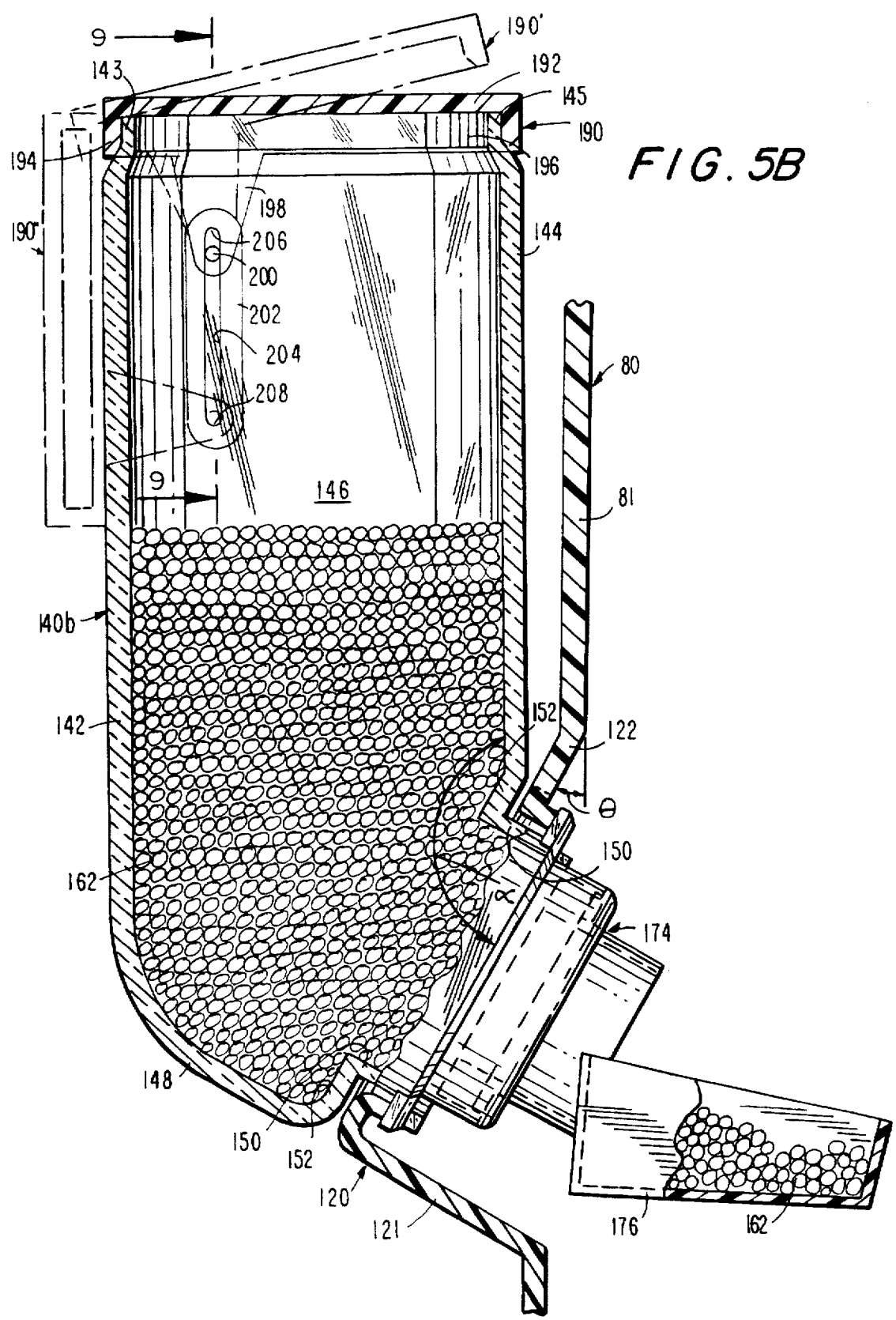
Figure 7:
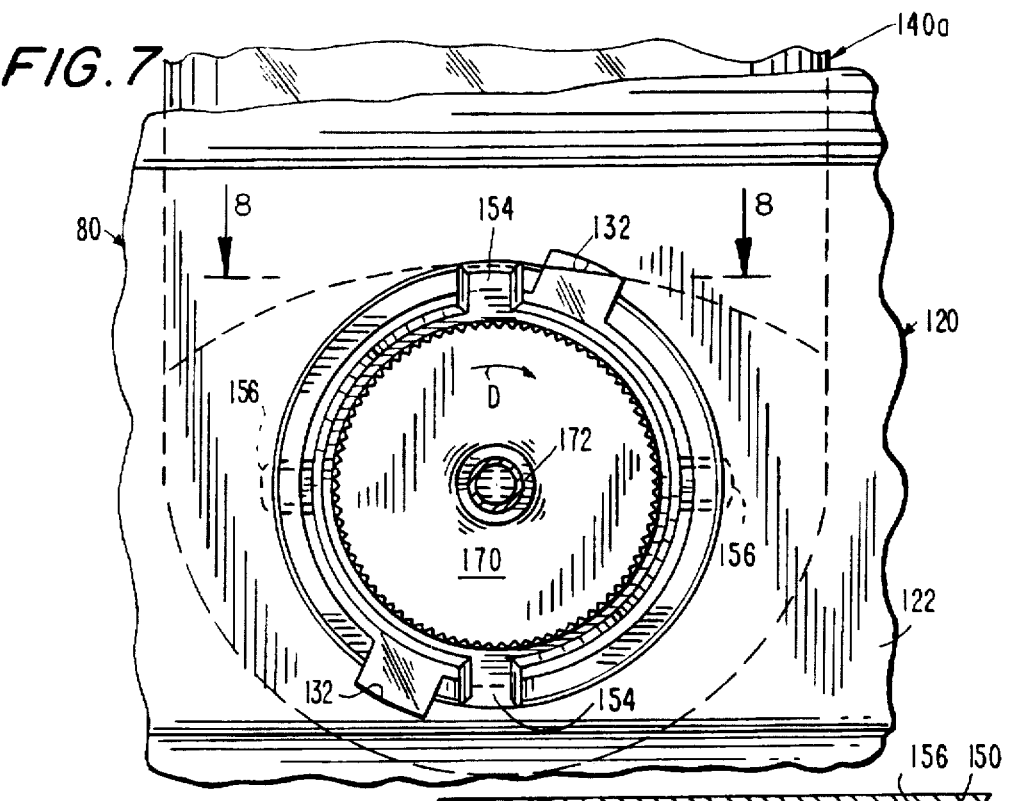
Figure 8:
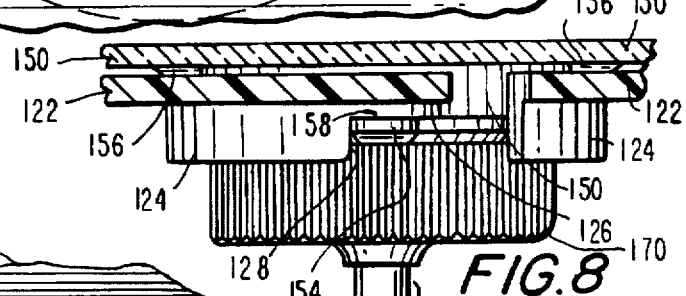
Figure 6:
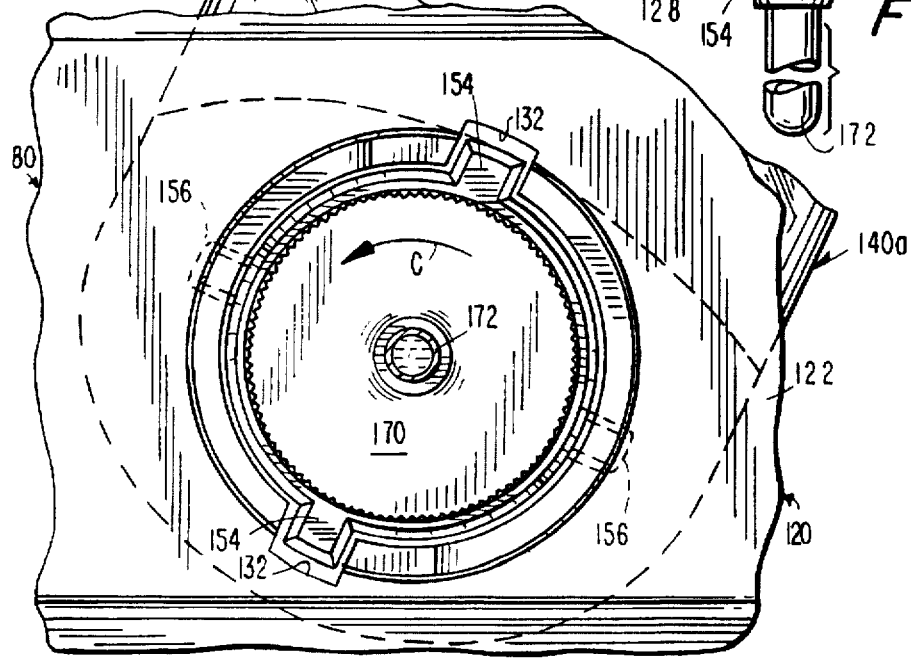

FIB. 5B is a sectional view of a food bottle constructed in accordance with the present invention taken along the line 5B—5B of FIG. 1;

FIG. 6 is an enlarged elevational view taken from the line 7—7 of FIG. 5A showing a turn-key assembly constructed in accordance with the present invention for mounting a bottle to a door of a rabbit housing, the bottle being disposed in a position for inserting or removing the bottle from the door;

FIG. 7 is an enlarged elevational view taken from the line 7—7 of FIG. 5A showing a turn-key assembly constructed in accordance with the present invention for mounting a bottle to a door of a rabbit housing, the bottle being disposed in a mounted and secured position with respect to the door;

FIG. 8 is a sectional view taken along the line 8—8 of FIG. 7;

FIG. 9 is a sectional view taken along the line 9—9 of FIG. 5B; and

FIG. 10 is a rear perspective view of a rabbit housing system constructed in accordance with the present invention.

DETAILED DESCRIPTION OF THE PREFERRED EMBODIMENTS

Figure 2:
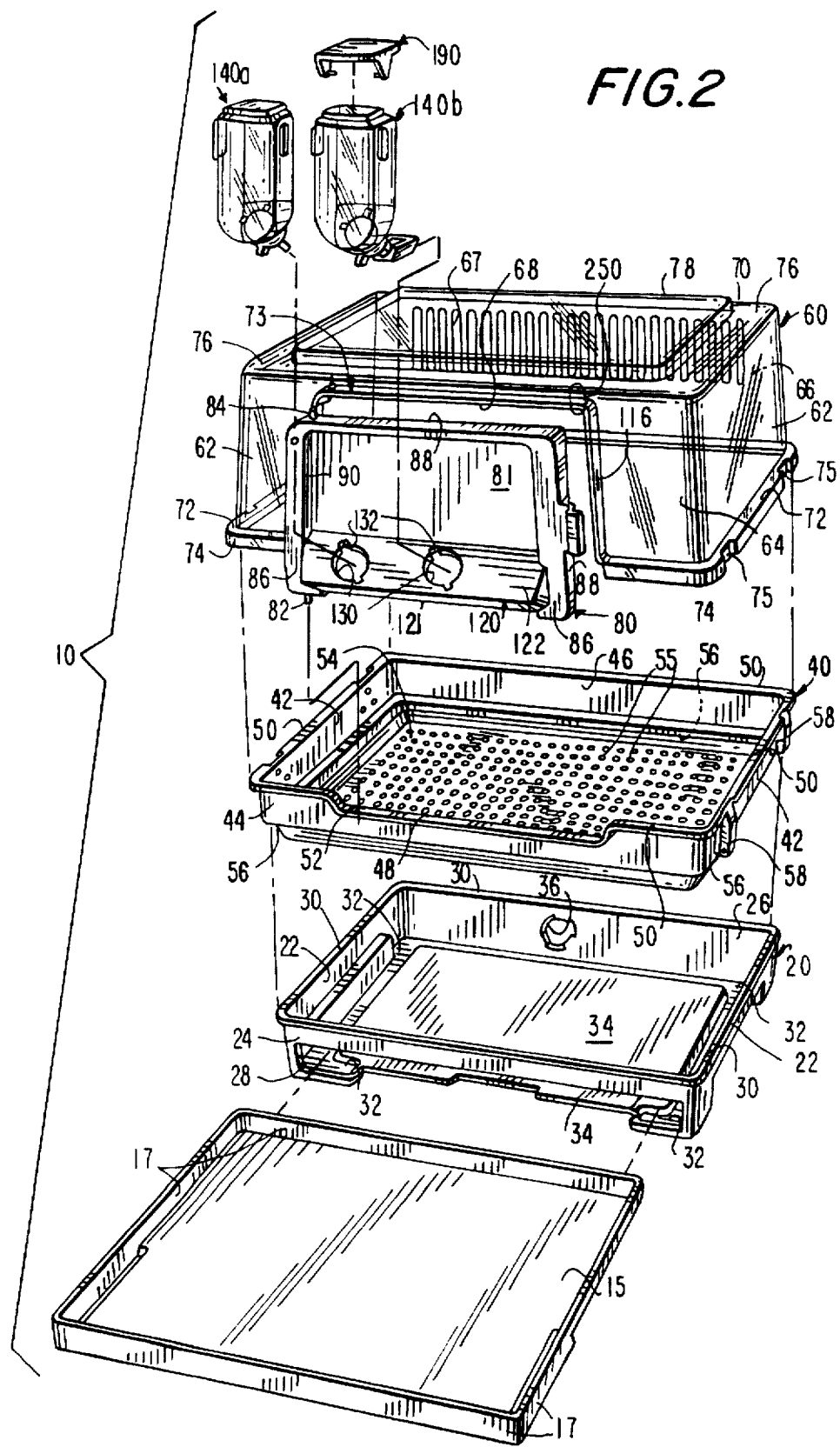
FIG. 2 is an exploded perspective view of a rabbit housing constructed in accordance with the present invention.

Reference is first made to FIGS. 1 and 2, wherein a rabbit housing, generally indicated at 10, constructed in accordance with the invention is shown. While the present invention is particularly suited for the housing of rabbits, it is to be understood that the invention is equally applicable to housing other animals, such as guinea pigs and ferrets, for example. Rabbit housing 10 includes a skirt, generally indicated at 20, a housing bottom, generally indicated at 40, and a housing top, generally indicated at 60. A door, generally indicated at 80, is provided so as to be closable in housing top 60, and may also be provided so as to be closable in part in housing bottom 40. Generally speaking, housing bottom 40 rests on skirt 20, and housing top 60 rests on housing bottom 40. A pan 15 may be slidably disposed within skirt 20.

Skirt 20 includes generally upstanding side walls 22, a front wall 24 and a rear wall 26. Front wall 24 is provided with an opening 28 for sliding rectangular pan 15 therethrough. A lip 30 is provided about the top perimeter of side walls 22, front wall 24 and rear wall 26. Rear wall 26 preferably includes an aperture 36 for providing access to an air exhaust hose as will be discussed below. Skirt 20 also preferably includes a bottom perimeter surface 32 depending substantially perpendicularly from the bottom perimeter of side walls 22, front wall 24 and rear wall 26. A raised platform 34 is preferably disposed within bottom perimeter surface 32, thereby creating a shallow, concave mating surface for the top surface of another housing, as described below, as well as a positioning platform for pan 15.

Housing bottom 40 includes generally upstanding side walls 42, a front wall 44 and a rear wall 46. Front wall 44 is preferably provided with a depression 48 for receiving at least a portion of door 80. A lip 50 is provided about the top perimeter of side walls 42, rear wall 46, and front wall 44 including depression 48. A hole 52 is provided in lip 50 for receiving a pin 82 which comprises part of a hinge for door 80, which will be further described below. A lateral peripheral flange 56 extends substantially perpendicular and inward from side walls 42, front wall 44 and rear wall 46. A pan-shaped floor 54 depends from the perimeter of peripheral flange 56. Floor 54 is provided with perforations 55 therein. Floor 54 is preferably constructed of plastic, and perforations 55 are preferably dimensioned so as to allow dander, urine and feces to pass therethrough while supporting an animal such as a rabbit, including said animal's feet, thereon. Plastic is less thermally conductive than the prior art steel, staying warmer than steel providing a better environment for the animal therein. Pan 15 is at least coextensive with the perforated region of floor 54.

Housing top 60 includes a substantially rectangular top surface 70. Side walls 62, a front wall 64 and a rear wall 66 depend substantially perpendicularly from top surface 70. Rear wall 66 is provided with one or more openings 67 therein to permit the passage of air therethrough. Openings 67 may be covered with a suitable filter material. A portal 68 is provided in front wall 64 for receiving door 80. A lateral peripheral flange 72 extends substantially perpendicular and outward from side walls 62, rear wall 66 and front wall 64, including portal 68. A hole 73 is provided in flange 72 adjacent portal 68 for receiving a pin 84 which comprises part of a hinge for door 80, which will be further described below. A rim 74 depends substantially perpendicularly from lateral peripheral flange 72 along side walls 62, front wall 64 and rear wall 66. Top surface 70 includes a relatively narrow perimeter 76 and a shallow, raised mating surface 78 extending therefrom. Housing top 60 is preferably comprised of a transparent, solid (unperforated) material such as clear plastic.

Flange 72 of housing top 60 is configured so as to rest atop lip 50 of housing bottom 40 when housing top 60 is mounted on housing bottom 40, while rim 74 is configured to closely surround lip 50 to prevent lateral movement of housing top 60 with respect to housing bottom 40 when mounted. For added security, quarter turn locks or latches 58 may be provided on side walls 42 of housing bottom 40 which grip flange 72 of housing top 60 within flange recesses 75 so as to firmly retain housing top 60 against housing bottom 40. Flange 56 of housing bottom 40 is configured so as to rest atop lip 30 of skirt 20 when housing bottom 40 is mounted on skirt 20, while pan-shaped perforated floor 54 rests snugly within lip 30. Top surface 70 of housing top 60 is configured so as to permit a skirt (not shown) of a second housing (FIG. 10) to be securely stacked thereupon. Specifically, the bottom perimeter surface of the skirt of second housing 10' rests upon perimeter 76 of top surface 70, while mating surface 78 fits snugly within the bottom perimeter surface of second housing 10' and extends upward into the shallow cavity created by the bottom surface and associated raised platform.

The preferably transparent and solid housing top 60 prevents dander from being transmitted to laboratory personnel. At the same time, housing top 60 also permits easy viewability of rabbits within housing 10 by laboratory personnel. Accordingly, rabbits within housing 10 may be observed by laboratory personnel at a significant distance from housing 10. In this manner, behavioral changes of rabbits within housing 10 are minimized because laboratory personnel need not be close to the housing to observe the rabbits as in prior art cages wherein observation typically occurred by standing close to an opaque cage and peering through a wire bar door in the cage.

Pan 15 rests on raised platform 34 when pan 15 is slid into skirt 20 through opening 28. When installed within skirt 20, pan 15 should be positioned below perforated floor 54 of housing bottom 40, and pan 15 should be dimensioned so as to extend laterally beyond the perforations of floor 54 so as to catch all materials which fall therethrough. Dander, urine and feces from animals within housing 10 fall through perforations 55 in floor 54 and are collected in pan 15. Aperture 36 is preferably disposed in the center of rear wall 26 of skirt 20.

Dander, urine and feces may be easily removed from housing 10 by merely sliding pan 15 out from skirt 20 and either cleaning pan 15 or by replacing it with a second, clean pan 15 within skirt 20. Thus, aside from pan 15 itself, no part of housing 10 need be moved or even touched to remove dander, urine and feces from housing 10. Pan 15 consequently facilitates changing or cleaning pans.

As shown in FIGS. 1–4, door 80 of animal housing 10 is also substantially solid to prevent the transmission of rabbit dander therethrough. Door 80 includes a substantially rectangular frame 86 dimensioned to be received within portal 68 of housing top 60 and depression 48 of housing bottom 40 when housing top 60 is mounted on housing bottom 40. Frame 86 includes integral outer and inner peripheral flanges 88 and 90 respectively which extend around the perimeter of frame 86 towards the inside of housing 10. A recessed panel 81 is provided within an upper portion of inner peripheral flange 90. Door 80 is also preferably constructed of a transparent, solid material such as clear plastic.

Figure 3:
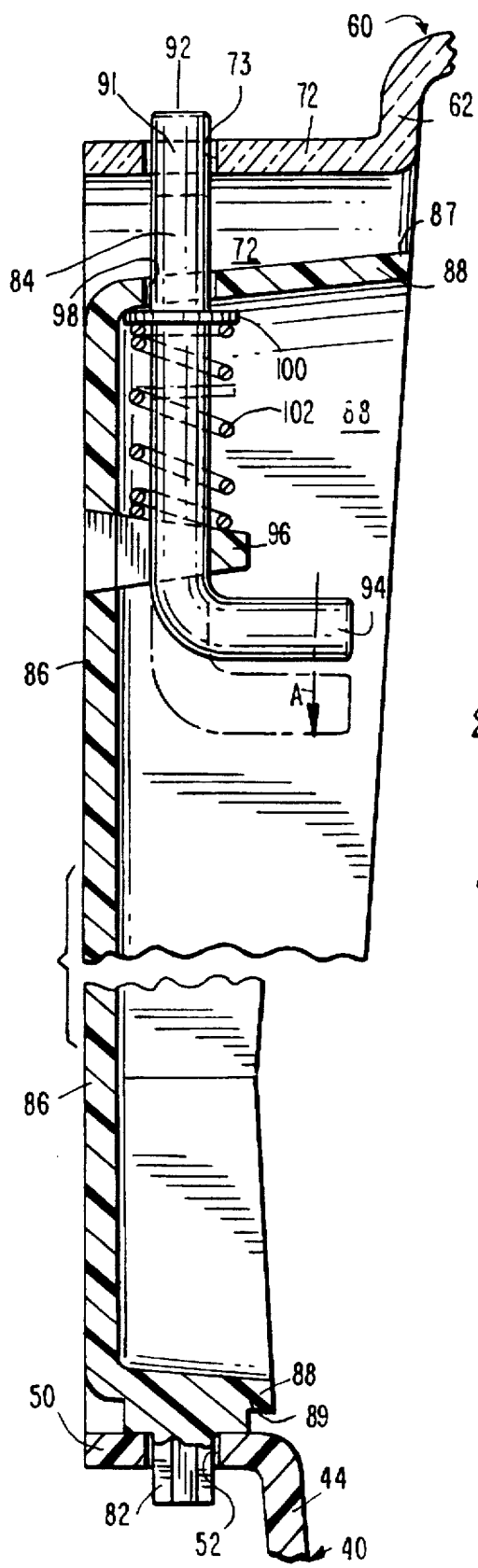
FIG. 3 is a sectional view taken along the line 3—3 of FIG. 1.

As most clearly depicted in FIG. 3, door 80 is preferably pivotably and removably mounted between housing top 60 and housing bottom 40 utilizing at least one spring-biased top pin 84 and a bottom pin 82. Bottom pin 82 is provided on a bottom end 89 of flange 88. Bottom pin 82 is positioned to extend through hole 52 of housing bottom 40 to allow door 80 to freely pivot about bottom pin 82. Top pin 84 is preferably J-shaped as shown and includes a shaft 91 with a tip 92 at one end and a pull 94 at the other end. Shaft 91 is disposed within a hole (not shown) of a retainer 96 which is preferably integrally molded in frame 86. Shaft 91 passes through a hole 98 in a top end 87 of flange 88. A retainer clip 100 is affixed to shaft 91, preferably by being clipped into a groove (not shown) in shaft 91, at a position which allows tip 92 to extend through hole 73 of housing top 60 when pin 84 is pushed to its furthest possible extension (that is, the point at which retainer clip 100 abuts flange 88). A spring 102 is disposed between retainer 96 and retainer clip 100 which biases tip 92 of pin 84 upward and through hole 73 of housing top 60. Door 80 may thus be easily opened and closed by pivoting door 80 about pins 82 and 84. Door 80 may also be easily removed from housing 10 by forcing pull 94 of pin 84 downwards in the direction of arrow A, thus compressing spring 102, to retract tip 92 from hole 73. Door 80 may then be lifted slightly upwards to remove pin 82 from hole 52 of bottom housing 40. Alternatively, pin 82 may be spring-biased in a manner similar to that described for pin 84, but in a direction opposite that of pin 84. In this arrangement, pin 82 may be similarly retracted from hole 52 to allow removal of door 80.

Figure 4:
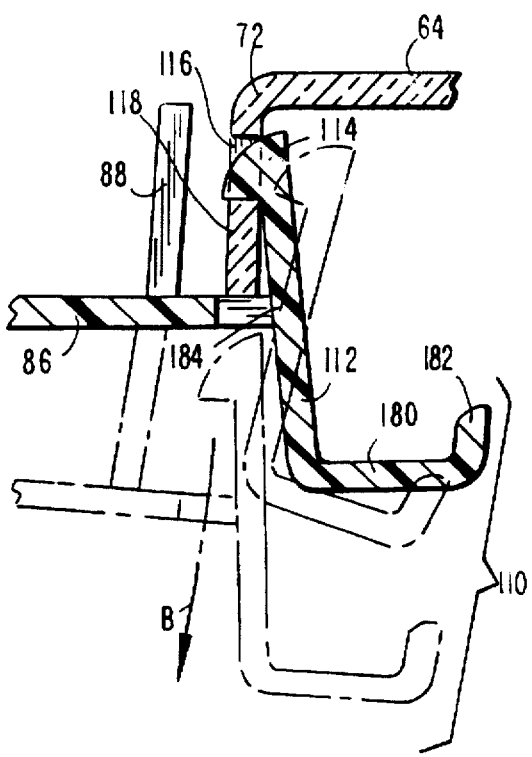
FIG. 4 is a sectional view taken along the line 4—4 of FIG. 1.

When door 80 is in a closed position, as shown in FIG. 1, door 80 is secured to housing 10 by pins 82 and 84 and by a latch 110 which prevents animals within housing 10 from opening door 80. As shown in FIG. 4, latch 110 includes a lever member 112 which is elastically or resiliently mounted to frame 86. A first end of lever member 112 is provided with a tooth 114. When door 80 is in the closed and latched position shown in FIG. 1, tooth 114 engages a slot 116 (FIGS. 2 and 4) in a portion of flange 72 adjacent door 80. Restraining portion 118 of flange 72 accordingly prevents tooth 114 from movement in the direction in which door 80 opens, indicated by arrow B of FIG. 4. A handle 180 preferably depends from a second end of lever member 112 in a direction opposite that in which tooth 114 depends from lever member 112. To unlatch door 80 from housing 10, handle 180 is pulled in the direction shown in phantom in FIG. 4, pivoting lever member 112 about a joint 184 between lever member 112 and frame 86. The pivoting of lever member 112 about joint 184 releases tooth 114 from slot 116 thereby permitting door 80 to pivot about pins 82 and 84 to open in the direction of arrow B (FIG. 4). Handle 180 preferably includes a stub 182 to allow handle 180 to be more securely gripped by human fingers without slippage.

It should be noted that the relative movement of lever member 112 with respect to frame 86 may be imparted by employing a hinge or similar mechanism between lever member 112 and frame 86, or by forming joint 184 between lever member 112 and frame 86 of an elastic yet resilient material. Preferably, however, lever member 112 and frame 86 are integrally constructed, and the deformation of lever member 112 with respect to frame 86 is permitted by the material from which they are constructed.

The preferably transparent and solid door 80, like similarly constructed housing top 60, further prevents transmission of dander or other contaminants or allergens to personnel.

A bottle support, generally indicated at 120, is provided within a lower portion of inner peripheral flange 90 and recessed panel 81. As shown in FIGS. 5A and 5B, bottle support 120 is generally triangular in vertical cross-section and includes a lower panel 121 extending upwardly and outwardly from frame 86, and an upper panel 122 which extends downwardly and outwardly at a predetermined angle θ from recessed panel 81. Upper panel 122 is provided with one or more bottle-receiving holes 130 for mounting one or more bottles, indicated at 140a and 140b, thereto.

Each bottle 140a and 140b includes a containment portion including a front wall 142, a rear wall 144 and generally perpendicular side walls 146. Front wall 142 is generally rounded near the bottom 148 thereof, and side walls 146 also taper inward to form a substantially circular mouth 150 surrounded at the base thereof by a peripheral shoulder 152. Mouth 150 is substantially tubular and is at least partially insertable through one of the bottle-receiving holes 130. At least one interior flange 154 and at least one exterior tab 156 are provided on the outer circumference of mouth 150. Exterior tab 156 is preferably formed on shoulder 152. Mouth 150 is disposed at an angle α with respect to rear wall 144, α being substantially the supplement of θ, such that when mouth 150 is inserted through hole 130 in door 80, walls 142, 144 and 146 of bottle 140a and 140b are substantially vertical and parallel to panel 81 of door 80, and shoulder 152, flanges 154 and tabs 156 are substantially parallel to upper panel 122. In particular, rear wall 144 of bottle 140a and 140b is preferably as close as possible to recessed panel 81. The axis of mouth 150 is preferably oriented downward at a 30° angle from horizontal. Accordingly, the angle θ is preferably approximately 30° when panel 81 is substantially vertical.

As shown in FIGS. 2 and 5–8, each bottle 140a and 140b is preferably secured to bottle support 120 using a turn-key system. A guide sleeve 124 for closely receiving mouth 150 is provided about bottle-receiving hole 130 in bottle support 120. Guide sleeve 124 includes a restraining ledge 126 and a turn-stop 128. At least one notch 132 is provided in upper panel 122 and guide sleeve 124 adjacent bottle-receiving hole 130. Notch 132 communicates with restraining ledge 126. Interior flange 154 is configured and positioned so as to pass through notch 132 when mouth 150 is inserted through bottle-receiving hole 130 and guide sleeve 124. At the point of full insertion, exterior tab 156 rests flush against upper panel 122 of bottle support 120, and a back end 158 of flange 154 is laterally aligned with restraining ledge 126.

As shown in FIG. 6, bottle 140a and 140b is mounted to door 80 by aligning interior flange 154 with notch 132. Mouth 150 is then fully inserted through bottle receiving hole 130 and guide sleeve 124. Bottle 140a and 140b is next rotated in the direction of arrow C so that interior flange 154 engages and is rotated along restraining ledge 126. Bottle 140a and 140b is rotated in the direction of arrow C until interior flange 154 is in contact with turn-stop 128, as shown in FIGS. 7 and 8. In this position, bottle 140a and 140b is locked in and secured against door 80. In particular, interior flange 154 and exterior tab 156 are in compressive engagement with restraining ledge 126 of sleeve 124 and upper panel 122 respectively, thereby preventing all but rotational movement of bottle 140a and 140b with respect to door 80. Alternatively, exterior tab 156 may be omitted and interior flange 154 and shoulder 152 may be in compressive engagement with upper panel 122. Interior flange 154, notch 132 and turn-stop 128 are configured such that walls 142, 144 and 146 of bottle 140a and 140b are vertical when bottle 140a and 140b is fully rotated in the direction of arrow C such that interior flange 154 abuts turn-stop 128. To remove bottle 140a and 140b from door 80, bottle 140a and 140b is simply rotated in the direction of arrow D shown in FIG. 7 until interior flange 154 and notch 130 are realigned, as shown in FIG. 6, at which point mouth 150 of bottle 140a and 140b may be withdrawn from hole 130 of door 80. In a preferred embodiment, two notches 132 are provided at opposite ends of a diameter of hole 130, and two interior flanges 154 are provided on mouth 150 of bottle 140a and 140b which are aligned to mate with notches 130. In this preferred embodiment, two exterior tabs 156 are also provided at opposite ends of a diameter of mouth 150 and at approximately a 90° offset around mouth 150 from the two interior flanges 154.

Bottles 140 may contain and supply, for example, food or water for rabbits within housing 10. As shown in particular in FIG. 5A, bottle 140a may contain a supply of water 160. Water 160 may be held within bottle 140a and supplied to animals within housing 10 by sealing mouth 150 with a cap 170 provided with a selectable water flow apparatus 172, such as a "lick-it" valve (such valves are disclosed, for example, in U.S. Pat. No. 5,253,842, assigned to Lab Products, Inc.), or a conventional sipper tube. As shown in FIG. 5B, bottle 140b may contain a supply of food 162. Food 162 may be held within bottle 140b and supplied to animals within housing 10 by providing a cap 174 on mouth 150 with a food scoop 176 for presenting food 162 to the animals. It should be noted that providing the axis of mouth 150 at a 30° angle from horizontal as described above ensures the optimum supply of water from bottle 140a through selectable water flow apparatus 172, as well as the optimum supply and resupply of food into food scoop 176 from bottle 140b. Both water bottle 140a and food bottle 140b are mounted to door 80 using the same turn-key assembly described above. Bottles 140a and 140b are preferably integrally constructed of a transparent plastic to permit viewing the material therein and, when not full, to permit viewing through bottle 140a and 140b and door 80 to enhance the overall observability of rabbits within housing 10. To further promote viewing of animals within housing 10, water bottle 140a may be removed and replaced by a water plenum coupled to a valve disposed within a hole 250 within housing 10, as known from U.S. Pat. No. 3,363,264, assigned to Lab Products, Inc., for example.

Because door 80 is made from plastic or other low weight material, it is relatively light compared to the load of water and food mounted thereon. Furthermore, the turn-key bottle mounting design described above allows easy, quick mounting and removal of bottles 140 to and from door 80 while maintaining the dander barrier created by substantially solid door 80 and housing top 60.

To allow refilling of the contents within bottles 140a and 140b, and in particular food bottle 140b, without removal of bottle 140b from door 80, a pivotable and slidable lid, generally indicated at 190, is employed. As shown in FIGS. 1, 2, 5B and 9, bottle 140b may be formed with an open top. In particular, the top of bottle 140a may be cut horizontally across shoulder 141 to produce bottle 140b with an open top. Lid 190 includes a top plate 192 dimensioned so as to cover the open top of bottle 140b. Relatively shallow peripheral front and rear walls 194 and side walls 196 depend substantially perpendicularly from the outer edge of top plate 192 and are dimensioned so as to closely fit the tops 143, 145 and 147 of walls 142, 144 and 146, respectively, of bottle 140b. An arm 198 depends from each side wall 196. Each arm 198 includes a peg 200 projecting toward the opposite arm 198. Bottle 140b includes an elongated vertical guide 202 on each side wall 146. Each guide 202 includes a vertical groove 204. Each peg 200 projects into a respective groove 204 such that guides 204 prevent pegs 200 from being easily removed yet permit vertical travel of pegs 200 between ends 206 and 208 of groove 204, so that lid 190 may be opened to permit access to the interior of bottle 140b without detaching lid 190 from bottle 140b.

When mounted on bottle 140b, as shown by the position of lid 190 in FIG. 5B, pegs 200 rest slightly below top end 206 of groove 204. To open lid 190, lid 190 is pulled towards the technician, rotating lid 190 away from the open top as pegs 200 slide within grooves 204. Top end 206 of groove 204 is positioned so as to allow lid 190 to be clear of the top 143 of front wall 142 and away from housing 10 as shown by the position of lid 190' shown in phantom in FIG. 5B. At this point, lid 190 may be pivoted so that top plate 192 is substantially vertical. Lid 190 may then be slid down the outer front wall 142 of bottle 140b as pegs 200 slide downward within groove 204 to bottom end 208, as shown by the position of 190" of FIG. 5B. To close the lid, the above process is reversed.

In a preferred embodiment, tops 143, 145 and 147 of walls 142, 144 and 146, respectively, of bottle 140b are thinned and tapered slightly inward such that the exterior surface of walls 194 and 196 of lid 190 are flush with walls 142, 144 and 146 of bottle 140b. In addition, lid 190 may be more securely mounted to bottle 140b by using a snap-fit or friction-fit engagement. Further, lid 190 is preferably made of a substantially rigid yet resilient material like plastic so that arms 198 may be resiliently bent sufficiently to permit pegs 200 to be inserted into and removed from grooves 204, thereby allowing easy mounting and removal of lid 190 on bottle 140b. Lid 190 is preferably used when bottle 140b is used as a food dispenser, allowing for easy refill. When water is to be stored, a closed-top bottle 140a, having the same shape as bottle 140b but sealed by an integral top 190a, is preferably used as shown in FIG. 5A. Guides 202 may be formed as raised, generally oval landings on side walls 146. Alternatively, guides 202 may be formed within side walls 146 by providing grooves 204 as depressions or slots within side walls 146 themselves.

Reference is now made to FIG. 10, wherein a rabbit housing system, generally indicated at 210, is shown. Rabbit housing system 210 includes a plurality of rabbit housings described above stacked on a cart 220 or other suitable means of support. Cart 220 preferably includes wheels 222 for easy movement of rabbit housing system 210. One or more rabbit housings 10 are placed on a floor 224 or other basal support of cart 210, and additional rabbit housings 10' and 10" are stacked vertically atop rabbit housings 10. As described above, the top surface 70 of the housing top 60 of each housing 10 mates with and therefore securely supports the skirt 20' of the housing 10' stacked directly above housing 10. This same mating configurations is utilized to securely stack all housings 10 in a column within system 210 so that housing 10' securely supports the skirt". Accordingly, no separate shelving is needed to support each housing 10 upon cart 220. Rather, only a single basal support, such as floor 224, is necessary to support all housings 10 within system 210.

Rabbit housing system 210 also includes an air exhaust system, generally indicated at 230, providing a negative air pressure for drawing air out of each of the housings 10. Air exhaust system 230 includes a blower 232 and an air exhaust plenum 234, such as a hose, mounted on cart 220 and connected to each housing 10 through aperture 36 of skirt 20. Blower 232 creates negative pressure within air exhaust plenum 234, which thereby draws air out of housings 10. The negative air pressure thereby created within each housings 10 draw fresh air through openings 67 in each housing top 60. Openings 67 are preferably filtered, as described above, and the exhaust of blower 232 is also preferably filtered. Furthermore, the ammonia and other gases from pan 15 are drawn away from the housing through aperture 36. Consequently, air exhaust system 230 maintains a supply of fresh air to rabbits within housings 10 while removing used air which may also contain ammonia and increased humidity resulting from urine and feces within each housing 10. As a result of the reduced ammonia and humidity build-up, the pan need not be changed as often.

By providing a transparent and solid housing top, a housing is provided which prevents dander from being transmitted to laboratory personnel while also permitting easy observability of rabbits within the housing by laboratory personnel. Accordingly, rabbits within the housing may be observed by laboratory personnel at a significant distance from the housing, thereby minimizing any behavioral changes of rabbits within the housing. In addition, by providing a transparent and solid door for the housing, transmission of dander or other contaminants or allergens to personnel is further prevented and observability of rabbits within the housing is further enhanced.

By providing a solid door for a housing with at least one bottle mounted through a hole in the door using a turn-key bottle mounting assembly, bottles for supplying food water to rabbits within the housing are provided which may be easily and quickly mounted and removed from the door while maintaining a dander barrier created by the substantially solid door in the housing. By providing a lid for a bottle mounted to a door of a housing which is pivotable and slidable with respect to the walls of the bottle, secure containment of food within the bottle is provided in a configuration that allows the lid to be easily opened and closed without detaching the lid from the bottle, which could subject the lid to accidental loss. As a result, food may be supplied without removing the bottle from the door.

By providing a plurality of housings which are stackable within a rabbit housing system without shelving, a rabbit housing system is provided which is more compact, reduces manufacturing costs and is lighter in weight than traditional rabbit housing systems. In addition, by providing a rabbit housing system in which each housing is provided with a skirt with a slidably disposed pan for collecting feces, dander and urine, these waste products may be easily collected. Furthermore, by providing a rabbit housing system with a plurality of housings substantially constructed of a solid, unperforated, transparent material, and by creating a negative air pressure within each housing, the transmission of rabbit dander to laboratory personnel is minimized while the observability of rabbits within the rabbit housing system is enhanced.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An animal housing comprising:
    a frame;
    at least one bottle, the bottle including a mouth having at least one lateral interior flange and at least one lateral exterior tab extending from the outer circumference thereof; and said frame including a panel having at least one bottle-receiving aperture for receiving the mouth of the bottle, the panel also including at least one notch adjacent the aperture for receiving the interior flange of the bottle, such that the mouth of the bottle may be inserted into the aperture and the at least one interior flange may be inserted through the at least one notch, and the bottle may be rotated to secure at least a portion of the panel between the at least one interior flange and the at least one exterior tab.

2. The animal housing of claim 1, wherein the frame comprises a door for the animal housing.

3. The animal housing of claim 2, wherein the panel is recessed within the frame of the door.

4. The animal housing of claim 3, wherein the panel further includes a bottle support, and the at least one aperture is disposed in the bottle support.

5. The animal housing of claim 4, wherein the bottle support is substantially triangular in vertical cross-section.

6. The animal housing of claim 4, wherein the bottle support further includes an upper bottle support panel, the at least one aperture is disposed in the upper bottle support panel, and the upper bottle support panel is disposed at an angle of approximately 30° from vertical.

7. The animal housing of claim 1, wherein the frame comprises a side of the animal housing.

8. The animal housing of claim 1, wherein the mouth is substantially tubular and the aperture is substantially circular.

9. The animal housing of claim 1, wherein the at least one interior flange and the at least one notch are substantially rectangular.

10. The animal housing of claim 1, wherein the at least one interior flange comprises two flanges and the at least one notch comprises two notches.

11. The animal housing of claim 10, wherein the two interior flanges are arranged on opposite sides of a diameter of the mouth, and the two notches are arranged on opposite sides of a diameter of the aperture.

12. The animal housing of claim 1, wherein the bottle support further includes a sleeve disposed on the panel around the aperture, and wherein the notch extends through at least a portion of the sleeve.

13. The animal housing of claim 12, wherein the sleeve further includes a restraining ledge, such that the restraining ledge and the panel may be secured between the at least one interior flange and the at least one exterior tab.

14. The animal housing of claim 12, wherein the sleeve further includes a turn-stop which prevents rotation of the bottle in one direction when the at least one interior flange abuts the turn-stop.

* * * * *